Patented Mar. 27, 1934

1,952,725

UNITED STATES PATENT OFFICE 1,952,725

LIQUID SATURATING OR COATING MATERIAL AND PROCESS OF MAKING SAME

Izador J. Novak, Bridgeport, Conn., assignor to Raybestos-Manhattan, Inc., Bridgeport, Conn., a corporation of New Jersey No Drawing. Application September 16, 1931, Serial No. 563,219

15 Claims. (Cl. 134—26)

This application is a continuation in part of my co-pending application, Serial No. 247,755, filed January 18, 1928.

This invention relates to improvements in liquid saturating or coating material and to the process of preparing same, and refers more particularly to solutions or smooth mixtures of cresylic acid resins of the infusible type and China-wood oil particularly adapted for saturating or coating fibrous or solid bases, the saturating or coating material of the present invention being well adapted for use in indurating fibrous structures.

I am aware that it has been proposed to combine China-wood oil with condensation products of phenols and methylene-containing bodies, as for instance, U. S. Patent No. 1,212,738 to Brown, but it is evident that the resin in the final product obtained by Brown is not of the infusible type. It has also been proposed by Berend and Albert to reduce resins of the infusible type which normally are not soluble in drying oils to permanent fusibility and solubility in drying oils by the use of considerable amounts of rosin or other varnish gums in conjunction with high temperature treatment, the rosin functioning to effect this conversion. I wish to make clear that the type of phenolic resin, i. e., cresylic acid resin, used in my process is decidedly one of the infusible type, that is, one which becomes infusible and insoluble by virtue of internal polymerization or other molecular change and at comparatively low temperatures, and also that low temperatures are employed in the preparation of my product. Also, no natural resins or gums are necessary or essential in producing my product. I am also aware that it has been proposed by Baekeland, U. S. Patents Nos. 1,018,385 and 1,037,719, to add China-wood oil to previously prepared solutions of an infusible phenolic condensation product in combinations of alcohol, acetone, benzol and amyl alcohol, but in these cases the solvent comprises a very considerable proportion of the volume of the intended varnish, whereas my product is of maximum concentration and requires no added solvent to keep the resin and oil in solution. Baekeland's product might be a smooth mixture or solution due to the presence of the solvent or solvents which make of this a ternary or quarternary system, but with removal of the solvent, the oil and resin will separate, whereas my mixture is distinctly a binary mixture and does not separate.

The principal object of this invention is to produce a highly concentrated liquid capable of rapid cure to an infusible state, suitable for saturating or coating fibrous materials, in which the desirable characteristics of infusible cresylic acid resin may be combined with the modifying action of China-wood oil and the method herein described comprises essentially combining a particular type of ultimately infusible condensation product, i. e. cresylic acid resin, with China-wood oil at low temperatures to form a smooth, stable, liquid mixture.

A preferred method of carrying out the present invention may be described as follows: Cresylic acid and commercial 40% formaldehyde in substantially equal parts by weight may be mixed with an amount of 26° Baumé ammonia approximating one-third the weight of cresylic acid. After the reaction has taken place and the liquid reaction product has separated and settled to the bottom, which may take from one-half hour to one hour, the supernatant aqueous layer is decanted and discarded. The reaction product usually contains 2 to 4 percent of emulsified water which will separate on standing or may be removed by vacuum, centrifuging or other means.

It is to be noted that I propose to use a quantity of ammonia in excess of that required to promote the reaction between the cresylic acid and formaldehyde. For the purposes to which the product of the present invention is put, I have found that it is desirable to retain a considerable quantity of ammonia in the reaction product. However, as an inevitable result of the above described process, the excess will be removed in the separated water which results mainly from the aqueous ammonia and formaldehyde solutions. The resin as produced by the above method contains 3 to 5% combined nitrogen.

I have found that if the amount of ammonia is lower than .2 of a mole per mole of cresylic acid, unsatisfactory mixtures result because of the fact that plastic or solid insoluble material remains suspended in the mixture or precipitates from the mixture, making it unsuitable for use as a saturate or coating material. It is of advantage, therefore, to use an amount of ammonia which will induce sufficient solubility so as to allow the production of smooth, stable liquid mixtures. This amount of ammonia may range from .25 to .5 mole per mole of cresylic acid.

The liquid reaction product may be mixed with approximately two-thirds of its weight of China-wood oil and the mixture may be preferably heated by being raised to a temperature of from 180° to 220° F., more or less, until on cooling a stable, opaque, or clear liquid results. The heating step may be dispensed with and a satisfactory clear mixture obtained by simple, cold mixing by using, say a large excess of ammonia or a reaction product containing substantially no water. Where the mixture is heated, it is cooled as quickly as possible to retard thickening due to further reaction of the contained condensation product at the comparatively elevated solution temperatures mentioned. It may be desirable at this point to add thinners, such as xylol, gasoline, acetone, alcohol, or mixtures of these, to reduce the viscosity or concentration for specific uses. It must be emphasized that these solvents are in no way necessary to produce or aid solution between the resin and the oil.

The cooled mixture is then ready for use. It must be noted here that the solubility characteristics of the above cresylic acid condensation product are not general for potentially infusible phenolic resins. As a matter of fact, phenolic resins of the infusible type which are produced by the use of phenol in place of the cresylic acid mentioned above, do not mix smoothly with China-wood oil. Also, phenolic resins of the infusible type produced by the catalytic action of alkalies such as caustic soda, lime, soda ash, or salts such as sodium sulfite, ammonium chloride, ferric chloride, potassium sulfate, or acids such as hydrochloric acid, sulfuric and the like, do not mix smoothly with China-wood oil for the purposes of this invention. Further, the cresylic acid formaldehyde condensation product with ammonia is not miscible with China-wood oil unless the ammonia exceeds a certain proportion.

I have specified in the illustration given above a mixture of three parts condensation product to two parts of China-wood oil, but I do not wish to be limited to these proportions as the materials are miscible in all proportions. The desirable range for satisfactory utilization may be, however, between 20% of China-wood oil and 80% of China-wood oil in the mixture on the basis of weight.

As stated above, the liquid saturants or coating materials of the present invention are characterized by smoothness and stability at ordinary temperatures and have sufficiently low viscosity and surface tension characteristics so that they possess good saturating quality at atmospheric or superatmospheric pressures. Also, in proportions above 30% China-wood oil they are sufficiently stable so as to lend themselves to industrial and commercial use or to considerable periods of storage at ordinary temperatures without substantial impairment. It should also be noted that these mixtures as prepared are highly concentrated, for instance, in the example given, one hundred parts by weight of liquid saturant will produce about eighty-five parts by weight of hardened binder. These concentrated saturants may be thinned with acetone, benzol, or other suitable solvents to any desirable concentration. This is an advantageous characteristic in that saturants which have thickened through age or heating so that their saturating properties in the original concentration are impaired, may still be utilized for other purposes requiring lower concentrations.

It is of the utmost importance to bear in mind that the mixtures of the present invention are smooth, homogeneous, and stable, having characteristics which enable them to be used as saturating and coating materials as distinguished from mechanical mixtures of previously used fluid condensation products with China-wood oil which are characterized by the partial precipitation or suspension of insoluble solid or viscous matter.

I have found the saturants of the present invention can be used to advantage for impregnating fibrous materials, for instance, those to be utilized in the manufacture of induated frictional elements and more particularly clutch facings and brake linings, both of the woven and unwoven type. As a matter of fact, saturants of this invention impart to unwoven brake linings particularly desirable qualities which insure durability and a high coefficient of friction. Also, they allow the production of extremely dense products because of the fact that they are highly concentrated, and they may, therefore, be introduced into previously densified raw fibrous bases to obtain the effect of impregnating a less concentrated solution into a lighter stock followed by subsequent mechanical densification. It will also be appreciated by those skilled in the art that the products of the present invention permit me to utilize a treatment characterized by the advantage of rapid hardening under heat by virtue of the well known rapid reaction of infusible phenolic condensation products wherein the brittleness of these rapid setting phenolic condensation products is modified by the relative softness of polymerized or oxidized China-wood oil.

In the use of the product of the present invention as a coating, it is characterized by quick setting to an infusible state and also by relative flexibility, resiliency and expansibility without fracture. It may also be set at atmospheric pressures without any danger of damage or distortion due to gases evolved during the setting. This is a distinguishing feature from previous types of phenolic resin varnishes which are very susceptible to such damage.

I may also utilize the product of the present invention as an impregnant or binder for organic fibrous structures, as for instance in the production of varnished cambric or treated paper, or for impregnating cotton braids used in insulated wire and in general for any fibrous organic structure which is to be given body, toughness and/or hardness.

Modifying agents may be added to vary the characteristics of the final solidified product when desirable as for instance, vegetable oils, rubbers, pitches or other organic modifying agents as well as organic or inorganic fillers or fibrous materials.

From the foregoing it will be seen that I have produced a novel type of saturant or coating comprising cresylic acid resin of the infusible type dissolved with China-wood oil, characterized in that the China-wood oil does not prevent the cresylic acid resin from becoming infusible, and in the case of the undiluted mixture, further characterized in that the change from the liquid to a solid state may be effected without substantial change in volume.

I claim as my invention:

1. A smooth mixture consisting essentially of a fluid cresylic acid aldehyde condensation product containing 3 to 5 percent combined nitrogen said product being soluble in fatty oils and capable of transformation by heat to an infusible state, and China-wood oil, said mixture being transformable by heat into an infusible body.

2. A smooth mixture consisting essentially of a fluid, cresylic acid aldehyde condensation product containing 3 to 5 per cent combined nitrogen said product being soluble in fatty oils and capable of transformation by heat to an infusible state and China-wood oil, said mixture being transformable by heat into an infusible body without substantial change in volume.

3. A smooth, stable liquid mixture of a condensation product resulting from the reaction of cresylic acid, formaldehyde, and ammonia in excess of .25 mole per mole of cresylic acid characterized by solubility in fatty oils and by the presence of combined nitrogen, and China-wood oil.

4. A process which comprises reacting cresylic acid, formaldehyde, and ammonia, the latter in an amount at least equal to .25 mole per mole of cresylic acid, whereby to produce a fluid condensation product containing combined nitrogen which is soluble in fatty oils and thereafter mixing China-wood oil with said product to produce a smooth stable liquid mixture, transformable by heat into an infusible body.

5. A process which comprises reacting cresylic acid, formaldehyde, and ammonia, the latter in an amount at least equal to .25 mole per mole of cresylic acid, whereby to produce a fluid condensation product, containing combined nitrogen which is soluble in fatty oils and thereafter mixing China-wood oil with said product to produce a smooth stable liquid mixture, and subsequently converting said liquid mixture to infusible state by heat.

6. A limpid solution consisting essentially of a substantially anhydrous fatty oil soluble, fluid, cresylic acid aldehyde condensation product containing 3 to 5 percent combined nitrogen capable of transformation by heat to an infusible state, and China-wood oil, said mixture being transformable by heat into an infusible body.

7. A limpid solution consisting essentially of a condensation product resulting from the reaction of cresylic acid, formaldehyde and ammonia in excess of .25 mole per mole of cresylic acid characterized by solubility in fatty oils, combined nitrogen, and China-wood oil.

8. A process which comprises reacting cresylic acid, formaldehyde and ammonia, the latter in an amount in excess of .25 mole per mole of cresylic acid, whereby to produce a fluid, fatty oil soluble, condensation product containing combined nitrogen and capable of transformation by heat to an infusible state, thereafter mixing China-wood oil with said product, and subjecting said mixture to heat until same has become sufficiently clarified to remain limpid at normal temperature.

9. A process which comprises reacting cresylic acid, formaldehyde and ammonia, the latter in an amount in excess of .25 mole per mole of cresylic acid, whereby to produce a fluid, fatty oil soluble, condensation product containing combined nitrogen and capable of transformation by heat to an infusible state, thereafter mixing China-wood oil with said product, and subjecting said mixture to heat until the ingredients have become mutually dissolved and the solution is clear at normal temperature.

10. A process which comprises reacting cresylic acid, formaldehyde and ammonia, the latter in an amount in excess of .25 mole per mole of cresylic acid, whereby to produce a fluid, fatty oil soluble condensation product containing combined nitrogen and capable of transformation by heat to an infusible state, thereafter mixing China-wood oil with said product, and subjecting said mixture to heat until same has become sufficiently clarified to remain limpid at normal temperature, and then rapidly cooling the solution.

11. A process which comprises reacting cresylic acid, formaldehyde and ammonia, the latter in an amount in excess of .25 mole per mole of cresylic acid, whereby to produce a fluid, fatty oil soluble, condensation product containing combined nitrogen and capable of transformation by heat to an infusible state, thereafter mixing China-wood oil with said product, and subjecting said mixture to heat until same has become sufficiently clarified to remain limpid at normal temperature, and retarding further reaction by quickly cooling the solution.

12. A process which comprises reacting cresylic acid, formaldehyde and an amount of ammonia in excess of .25 mole per mole of cresylic acid to produce a fluid, fatty oil soluble, condensation product containing combined nitrogen, and thereafter mixing China-wood oil therewith to produce a smooth, stable liquid mixture.

13. A process which comprises reacting cresylic acid, formaldehyde and an amount of ammonia in excess of .25 mole per mole of cresylic acid to produce a fluid, fatty oil soluble, condensation product containing combined nitrogen, and thereafter mixing China wood oil therewith to produce a smooth, stable liquid mixture transformable by heat into an infusible body.

14. A process which comprises reacting cresylic acid, formaldehyde and an amount of ammonia in excess of .25 mole per mole of cresylic acid to produce a fluid, fatty oil soluble, condensation product, dehydrating the condensation product and thereafter mixing the condensation product with China-wood oil.

15. A process which comprises reacting cresylic acid, formaldehyde and an amount of ammonia in excess of .25 mole per mole of cresylic acid to produce a fluid, fatty oil soluble, condensation product, dehydrating the condensation product and thereafter mixing the condensation product with China-wood oil at substantially normal temperature.

IZADOR J. NOVAK.